United States Patent
Huang et al.

(10) Patent No.: US 7,688,402 B2
(45) Date of Patent: Mar. 30, 2010

(54) BACKLIGHT MODULE FOR LCD HAVING REFLECTIVE CURVED SURFACES FOR FORMING VIRTUAL LIGHT SOURCES

(75) Inventors: Kuo-Tsun Huang, Tainan County (TW); Chen-Pin Hung, Tainan County (TW)

(73) Assignee: Chi Mei Optoelectronics Corp., Tainan (TW)

( * ) Notice: Subject to any disclaimer, the term of this patent is extended or adjusted under 35 U.S.C. 154(b) by 347 days.

(21) Appl. No.: 11/362,340

(22) Filed: Feb. 27, 2006

(65) Prior Publication Data
US 2006/0197889 A1 Sep. 7, 2006

(30) Foreign Application Priority Data
Mar. 1, 2005 (TW) ............................... 94106000 A

(51) Int. Cl.
*G02F 1/1335* (2006.01)
*G09F 13/04* (2006.01)
*F21V 7/00* (2006.01)

(52) U.S. Cl. ..................... 349/67; 349/70; 362/97.1; 362/97.2; 362/247

(58) Field of Classification Search ............. 349/67, 349/70; 362/97.1, 97.2, 247
See application file for complete search history.

(56) References Cited

U.S. PATENT DOCUMENTS 5,253,151 A * 10/1993 Mepham et al. ............. 362/216
5,532,850 A * 7/1996 Someya et al. ................ 349/46
5,831,697 A * 11/1998 Evanicky et al. ............. 349/62

FOREIGN PATENT DOCUMENTS

CN 1149213 5/1997

* cited by examiner

*Primary Examiner*—Michael H Caley
(74) *Attorney, Agent, or Firm*—Chun-Ming Shih

(57) ABSTRACT

A backlight module includes a light box and multiple real light sources. The light box has an opening and a plurality of substantially parallel grooves recessed from a bottom surface thereof. Each of the slots has a reflection curved surface. A light source allocation line is defined between every two adjacent grooves. The light source allocation lines are parallel to the grooves. The sum of shortest distances between any point of the reflection curved surface and the two adjacent light source allocation lines is substantially the same. In addition, the real light sources are alternately allocated in the light source allocation lines. A part of light emitted from each light source is reflected from the reflection curved surface to the light source allocation line in which no light source is allocated. Thereby, a virtual light source is formed on the light source allocation line that does not contain a real light source.

26 Claims, 4 Drawing Sheets

US 7,688,402 B2

BACKLIGHT MODULE FOR LCD HAVING REFLECTIVE CURVED SURFACES FOR FORMING VIRTUAL LIGHT SOURCES

BACKGROUND OF THE INVENTION

1. Field of Invention

The present invention relates in general to a plane light source, and more particularly, to a backlight module for a liquid crystal display.

2. Related Art

As the performance of computers has been greatly improved, and the technologies of Internet and multi-medium have been highly developed, analog transmission of image information has been replaced by digital transmission. To compromise the modern life style, the video or image device is made thinner and lighter. Although the conventional cathode ray tube (CRT) display has the persistent advantage, the structure of the internal electronic cavity results in a large volume of the display and causes great radiation to hurt human's eyes. Therefore, the flat panel displays (FPDs) developed based on the optoelectronic and semiconductor technologies such as liquid crystal displays (LCDs), organic electro-luminescent displays (OELDs) or plasma display panels (PDPs) have become the mainstream display products.

The liquid crystal displays are categorized into three different types based on the light sources used thereby, including the reflective liquid crystal displays, the transmissive liquid crystal displays, and the trans-reflective liquid crystal displays. The transmissive or the trans-reflective liquid crystal displays are constructed by a liquid crystal panel and a backlight module. The liquid crystal panel includes two transparent substrates and a layer of liquid crystal sandwiched between two transparent substrates. The backlight module is used to provide a plane light source to the liquid crystal panel, so as to achieve the display effect. Generally speaking, the backlight module can be divided into direct-type or edge-lit type, where the direct-type backlight module is applied to the liquid crystal panel with larger size.

FIG. 1 illustrates a cross sectional view of a conventional backlight module. Referring to FIG. 1, the conventional backlight module 100 is a direct-type backlight module that includes a light box 100, a plurality of cold cathode fluorescence lamps (CCFL) 120, a diffusion plate 130, and an optical film 140. The cold cathode fluorescence lamps 120 are disposed in the light box 110. The light emitted from the cold cathode fluorescence lamps 120 is diverged within the light box 110 and transmit through the diffusion plate 130 and optical film 140, so as to provide a plane light source.

In the above backlight module 100, the cold cathode fluorescent lamps 120 are distributed in a way that a brighter light is resulted at the position above the cold cathode fluorescent lamps 120. Therefore, the uniformity of the plane light source is normally poor.

FIG. 2 shows the light divergence of the backlight module. As shown, cold cathode fluorescent lamps 120 are scattered in the light box 100. If the distance between the cold cathode fluorescent lamps 120 and the diffusion plate 130 is insufficient (such as $d_2$) for the light beams to spread, the light 122 above the diffusion plate 130 is more concentrated to worsen the uniformity of the plane light source. Therefore, the distance between the bottom of the light box 110 and the diffusion plate 130 has to be as long as $d_1$ to allow the light beam to spread sufficiently, so as to maintain the uniformity. In other words, the overall thickness of the backlight module 100 cannot be reduced.

SUMMARY OF THE INVENTION

A backlight module for a liquid crystal display (LCD) of the present invention provides a plane light source with enhanced brightness and uniformity.

A backlight module for a LCD of the present invention includes a light box and a plurality of real light sources. The light box has an opening and a plurality of substantially parallel grooves recessed from a bottom surface thereof. Each of the grooves includes a reflective curved surface and a light source allocation line is defined over the interface of every two adjacent grooves and parallel to the pair of adjacent grooves, and a sum of shortest distances between any point of each reflective curved surface and the light source allocation lines at two sides thereof is substantially the same. The real light sources are disposed on every other light source allocation lines. A part of light emitted from each of the real light sources is reflected by the reflective curved surface to the light source allocation lines on which the real light sources are not disposed, so as to form a plurality of virtual light sources alternately arranged with the real light sources.

In the above-mentioned backlight module, the reflective curved surface of each groove is a portion of an ellipse, and the light allocation lines are allocated on focal points of the respective ellipses.

In the above-mentioned backlight module, any two adjacent reflective curved surfaces are merged with each other to form a border line parallel to the light source allocation lines.

In the above-mentioned backlight module, the real light sources include line light sources and the line light sources include cold cathode fluorescent lamps or light-emitting diode array.

The above-mentioned backlight module further includes a diffusion plate located at the opening of the light box.

Furthermore, the backlight module includes an optical film disposed over the diffusion plate. The optical film includes a diffusion film or a brightness enhance film.

The backlight module as provided has a plurality of elliptic reflective curved surfaces formed on a bottom surface thereof. The real light sources are disposed on focal points of alternate elliptic reflective curved surfaces. Therefore, a part of light emitted from the real light sources will be reflected to the elliptic reflective curved surfaces to form a plurality of virtual light sources. In other words, a uniform plane source based on a plurality of real light sources and virtual light sources is obtained to provide more efficient luminescence.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
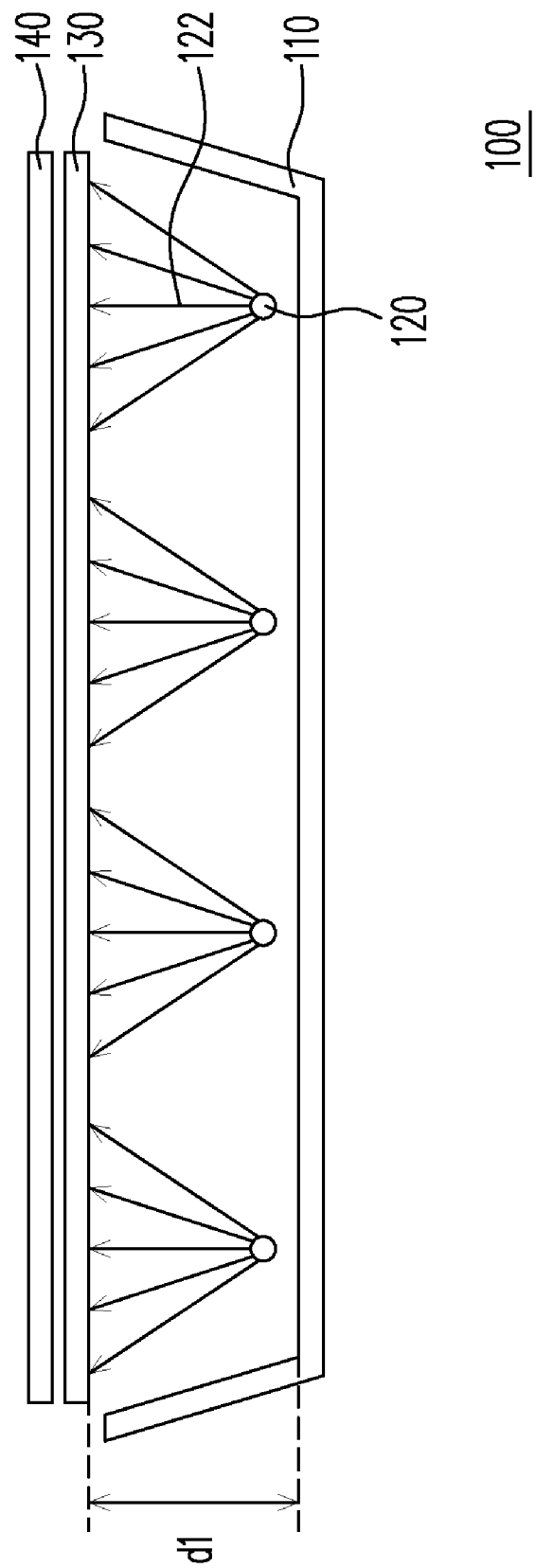
FIG. 1 shows a cross sectional view of a conventional backlight module.
Figure 2:
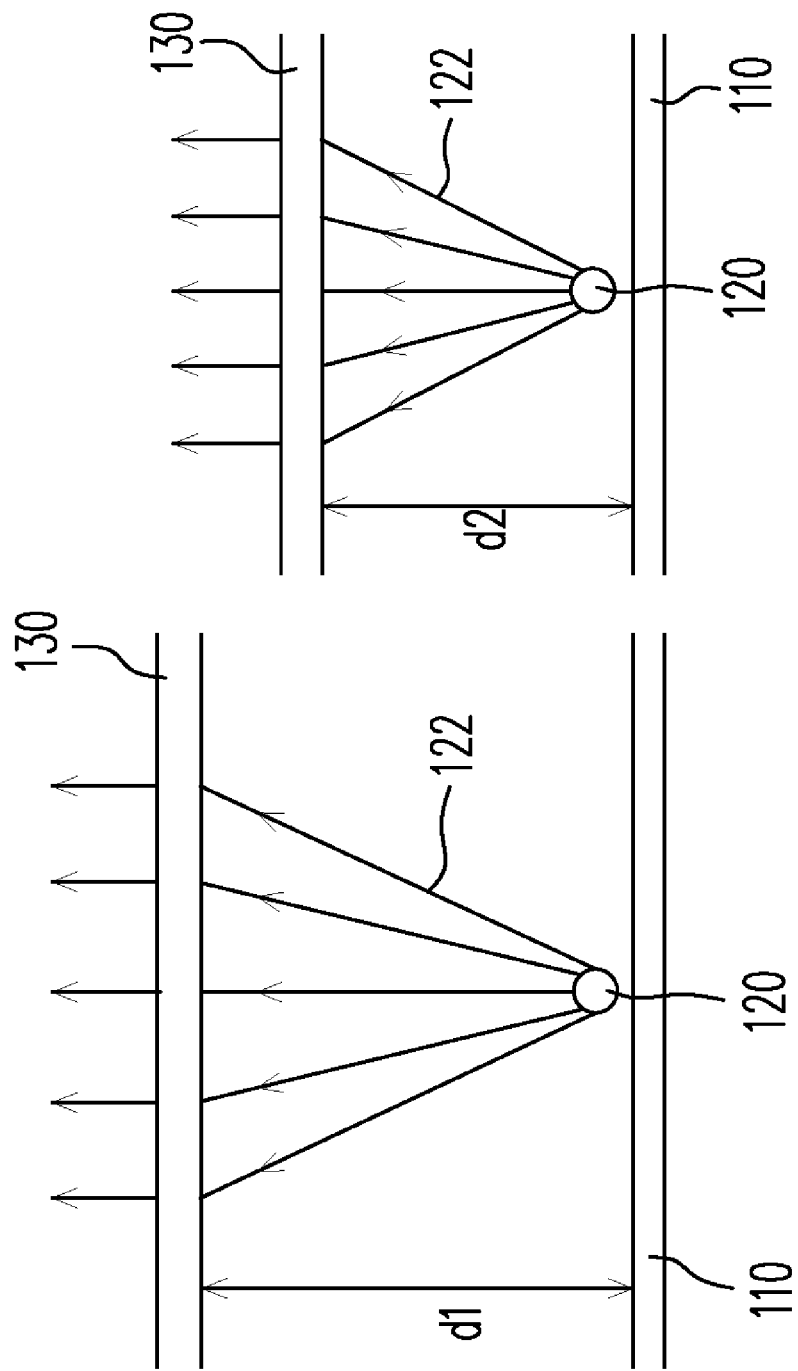
FIG. 2 shows the divergence of light generated by a conventional backlight module.
Figure 3:
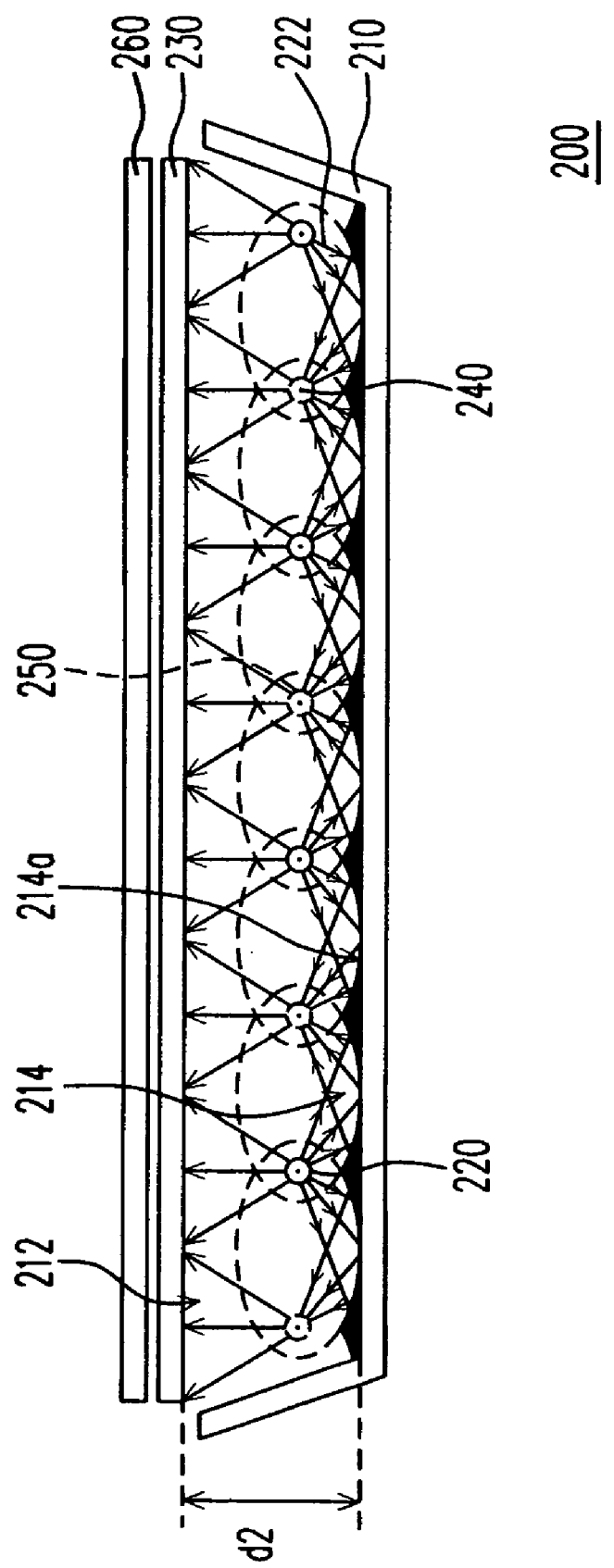
FIG. 3 shows a cross sectional view of a backlight module provided in one embodiment of the present invention.
Figure 4:
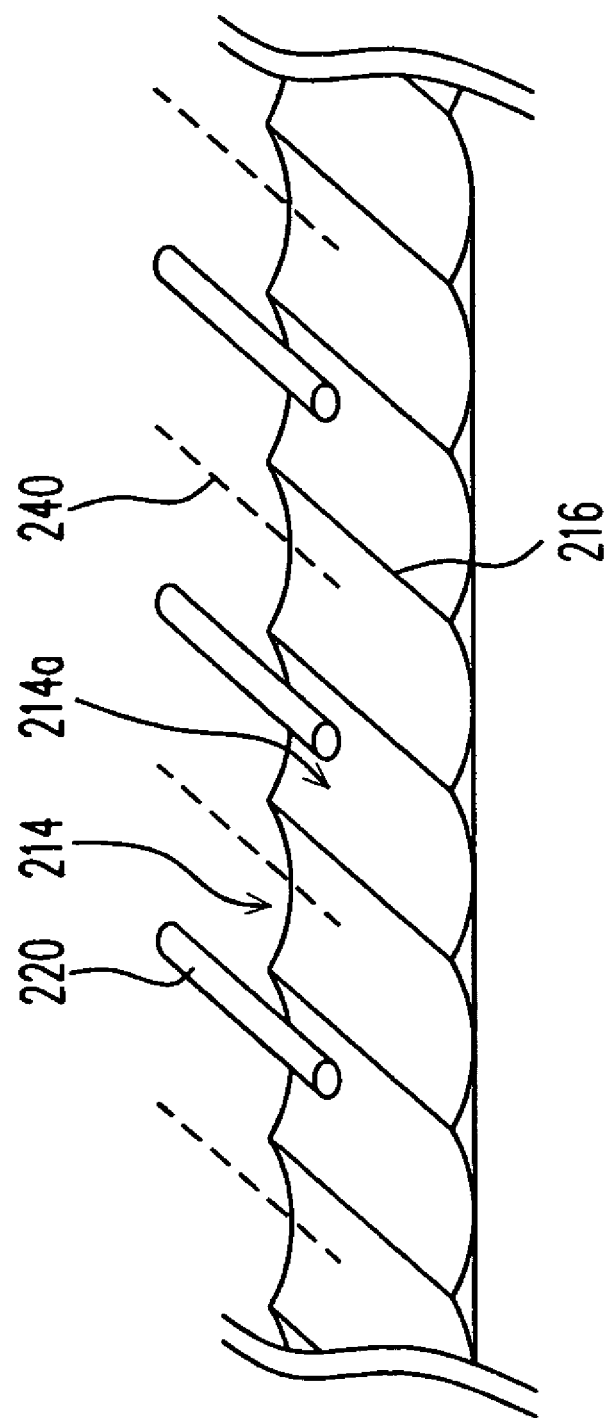
FIG. 4 shows a perspective view of grooves and real light sources of a backlight module according to the present invention.

FIG. 3 shows an embodiment of a backlight module, and FIG. 4 shows a perspective drawing of FIG. 3. Referring to FIGS. 3 and 4, the backlight module 200 is a direct-type backlight module. The backlight module 200 includes a light box 210 and a plurality of real light sources 220. The light box 210 has an opening 212 and a plurality of parallel grooves 214 recessed from a bottom surface thereof. The light box 210 further comprises a plurality of light source allocation lines 240 defined over the interface of each pair of adjacent grooves 214 and parallel to the pair of adjacent grooves 214. Each of the grooves 214 includes a reflective curved surface 214a, and the sum of shortest distances between any point of each reflective curved surface 214a and the two light source allocation lines 240 adjacent thereto at two sides is substantially the same. The real light sources 220 are mounted to the every other light source allocation lines 240. A part of the light emitted from each real light source 220 is reflected towards the light source allocation line 240 on which the real light source 220 is not mounted. Thereby, a virtual light source 250 is formed on each of the light source allocation line 240 that does not comprise the real light source 220.

In the backlight module 200, a border line 216 is formed between every two adjacent reflective curved surfaces 214a as an interface. The border lines 216 are parallel to the light source allocation lines 240. In addition, each of the grooves 214 is a reflective surface or coated by a reflective material to form the reflective curved surface 214a. The reflective material includes silver, aluminum or other metal.

The real light sources 220 include cold cathode fluorescent lamps, for example. It will be appreciated that the real light sources are not limited to cold cathode fluorescent lamps, other light sources such as light-emitting diode (LED) array can also be used.

The sum of the shortest distances between any point of the reflective curved surface 214a and the two adjacent light source allocation lines 240 is substantially the same. The reflective curved surface 214a may be designed with an elliptic profile, and the light source allocation lines 240 are located at the focal points of the elliptic profiles. Therefore, the downward part of the light beams 222 is effectively focused on the other two focal points of the two adjacent reflective curved surface 214a. More specifically, a part of the light beam 222 (the light beam propagates to the reflective curved surface 214a) emitted by the real light sources 220 is effectively focused on the two neighboring light source allocation lines 240 on which the real light source 220 is mounted, such that becomes a plurality of virtual light sources 250. These virtual light sources are actually the reflection of the real light sources 220 serving as the light source.

Each of the light allocation lines 240 includes either a real light source 220 or a virtual light source 250, such that the line light sources are more dense, and the plane light source provided by the backlight module 200 is more uniform. Further, as the light box 210 has more dense linear light source, such that the distance $d_3$ between the bottom of the light box 210 and the diffusion plate 230 does not have to be too long to provide sufficient space for the light beam 222 to spread. Therefore, the thickness of the light box 210 can be ultimately reduced, and the overall thickness of the backlight module 200 can be reduced.

In one embodiment, the backlight module 200 further includes a diffusion plate 230 and an optical film 260. The diffusion plate 230 is disposed at the opening 212 of the light box 210, while the optical film 260 is located over the diffusion plate 230 to improve uniformity of the plane light source provided by the backlight module 200. The optical film 260 is a diffusion film, a light gain film or a combination thereof.

According to the above, the backlight module has at least the following advantages.

1. A plurality of virtual light sources is generated in the light box to improve the brightness of the backlight module.

2. As each light source allocation line includes either a real light source or a virtual light source, such that the line light sources are more dense, and the uniformity of the plane light source is enhanced.

3. As the arrangement of the line light source is more dense than those provided in the conventional design, a smaller space is enough for the light beam to spread sufficiently. Therefore, the brightness requirement can be reduced, and the overall thickness of the backlight module is reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A backlight module, comprising:
a light box, having an opening and a plurality of substantially parallel grooves recessed from a bottom surface thereof, wherein each of the grooves includes a reflective curved surface and a light source allocation line is defined over the interface of every two adjacent grooves and parallel to the pair of adjacent grooves, and a sum of shortest distances between any point of each reflective curved surface and the light source allocation lines at two sides thereof is substantially the same; and
a plurality of real light sources disposed on every other light source allocation lines, wherein a part of light emitted from each of the real light sources is reflected by the reflective curved surface to the light source allocations on which the real light sources are not disposed, so as to form a plurality of virtual light sources alternately arranged with the real light sources,
wherein the reflective curved surface of each groove is substantially a portion of an ellipse, and the light allocation lines are substantially allocated on focal points of the respective ellipses, and
wherein adjacent ellipses share a common focal point.

2. The backlight module of claim 1, wherein any two adjacent reflective curved surfaces are merged with each other to form a border line parallel to the light source allocation lines.

3. The backlight module of claim 1, wherein the real light sources include line light sources.

4. The backlight module of claim 1, wherein the real light sources include cold cathode fluorescent lamps or light-emitting diode array.

5. The backlight module of claim 1, further comprising a diffusion plate located at the opening of the light box.

6. The backlight module of claim 5, further comprising an optical film disposed over the diffusion plate.

7. The backlight module of claim 6, wherein the optical film includes a diffusion film.

8. The backlight module of claim 6, wherein the optical film includes a light gain film.

9. The backlight module of claim 1, wherein all of the light source allocation lines are substantially arranged at a predetermined plane.

10. The backlight module of claim 1, wherein a distance from one of the virtual light source to the two adjacent real light sources is substantially equal.

11. A liquid crystal display, comprising:
a liquid crystal panel including two transparent substrates and a layer of liquid crystal sandwiched between the transparent substrates; and a backlight module used to provide a plane light source to the liquid crystal panel, so as to achieve a display effect, the backlight module including:

a light box, having an opening and a plurality of substantially parallel grooves recessed from a bottom surface thereof, wherein each of the grooves includes a reflective curved surface and a light source allocation line is defined over the interface of every two adjacent grooves, and a sum of shortest distances between any point of each reflective curved surface and the light source allocation lines at two sides thereof is substantially the same; and a plurality of real light sources disposed on every other light source allocation lines, wherein a part of light emitted from each of the real light sources is reflected by the reflective curved surface to the light source allocations on which the real light sources are not disposed, so as to form a plurality of virtual light sources alternately arranged with the real light sources, wherein the reflective curved surface of each groove is substantially a portion of an ellipse, and the light allocation lines are substantially allocated on focal points of the respective ellipses, and wherein adjacent ellipses share a common focal point.

12. The liquid crystal display of claim 11, wherein any two adjacent reflective curved surfaces are merged with each other to form a border line parallel to the light source allocation lines.

13. The liquid crystal display of claim 11, wherein the real light sources include line light sources.

14. The liquid crystal display of claim 11, wherein the real light sources include cold cathode fluorescent lamps or light-emitting diode array.

15. The liquid crystal display of claim 11, further comprising a diffusion plate located at the opening of the light box.

16. The liquid crystal display of claim 15, further comprising an optical film disposed over the diffusion plate.

17. The liquid crystal display of claim 16, wherein the optical film includes a diffusion film.

18. The liquid crystal display of claim 16, wherein the optical film includes a light gain film.

19. The liquid crystal display of claim 11, wherein all of the light source allocation lines are substantially arranged at a predetermined plane.

20. The liquid crystal display of claim 11, wherein a distance from one of the virtual light source to the two adjacent real light sources is substantially equal.

21. A backlight module, comprising:

a light box, having an opening and a plurality of substantially parallel grooves recessed from a bottom surface thereof, wherein each of the grooves includes a reflective surface and a light source allocation line is defined substantially right above an the interface of every two adjacent grooves and parallel to the pair of adjacent grooves and all of the light source allocation lines are substantially arranged at a predetermined plane, wherein the reflective curved surface of each groove is substantially a portion of an ellipse, and the light allocation lines are substantially allocated on focal points of the respective ellipses, and wherein adjacent ellipses share a common focal point; and a plurality of real light sources disposed on light source allocation lines, wherein a part of light emitted from each of the real light sources is reflected by the reflective surface to the light source allocation line on which the real light sources are not disposed, so as to form a plurality of virtual light sources.

22. The backlight module of claim 21, wherein a plurality of real light sources is disposed on every other light source allocation lines and a plurality of virtual light sources is alternately arranged with the real light sources.

23. The backlight module of claim 21, wherein a distance from one of the virtual light source to the two adjacent real light sources is substantially equal.

24. A backlight module, comprising:

a light box, having an opening and a plurality of substantially parallel grooves recessed from a bottom surface thereof, wherein each of the grooves includes a reflective surface and a light source allocation line is defined substantially right above an the interface of every two adjacent grooves and parallel to the pair of adjacent grooves, wherein the reflective curved surface of each groove is substantially a portion of an ellipse, and the light allocation lines are substantially allocated on focal points of the respective ellipses, and wherein adjacent ellipses share a common focal point; and a plurality of real light sources disposed on light source allocation lines, wherein a part of light emitted from each of the real light sources is reflected by the reflective surface to the light source allocations on which the real light sources are not disposed, so as to form a plurality of virtual light sources, wherein a distance from one of the virtual light source to the two adjacent real light sources is substantially equal.

25. The backlight module of claim 24, wherein a plurality of real light sources is disposed on every other light source allocation lines and a plurality of virtual light sources is alternately arranged with the real light sources.

26. The backlight module of claim 24, wherein all of the light source allocation lines are substantially arranged at a predetermined plane.

* * * * *